US011172157B2

United States Patent
Wang

(10) Patent No.: US 11,172,157 B2
(45) Date of Patent: Nov. 9, 2021

(54) PIXEL-WISE GAIN-ADJUSTED DIGITAL CONVERSION FOR DIGITAL IMAGE SENSORS

(71) Applicant: Shenzhen Goodix Technology Co., Ltd., Shenzhen (CN)

(72) Inventor: Xiaodong Wang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 8 days.

(21) Appl. No.: 16/742,969

(22) Filed: Jan. 15, 2020

(65) Prior Publication Data

US 2021/0218919 A1    Jul. 15, 2021

(51) Int. Cl.
 H04N 5/374 (2011.01)
 H04N 5/378 (2011.01)
 H04N 5/3745 (2011.01)

(52) U.S. Cl.
 CPC ......... *H04N 5/378* (2013.01); *H04N 5/37455* (2013.01); *H04N 5/37457* (2013.01)

(58) Field of Classification Search
 None
 See application file for complete search history.

(56) References Cited

U.S. PATENT DOCUMENTS 9,429,470 B2 * 8/2016 Hashimoto ............ H04N 1/028
 2014/0070074 A1  3/2014 Tachibana et al.
 2016/0249005 A1  8/2016 Matsumoto et al.

FOREIGN PATENT DOCUMENTS

WO   2016194622 A1   12/2016
 WO   2017222653 A1   12/2017
 WO   2019050606 A1    3/2019

OTHER PUBLICATIONS

S. Kawahito et.al., "A column based pixel-gain-adaptive CMOS image sensor for low-light-level imaging," IEEE ISSCC, Dig. Tech. Papers, Session 12.7, Feb. 2003.
H. Totsuka et al., "An APS-H-Size 250 Mpixel CMOS image sensor using column single-slope ADCs with dual-gain amplifiers," in IEEE, ISSCC Dig. Tech. Papers, Feb. 2016, pp. 116-117.
Masahiro Kobayashi, et.al., "A 1.8e-rms Temporal Noise Over 110-dB-Dynamic Range 3.4 μm Pixel Pitch Global-Shutter CMOS Image Sensor With Dual-Gain Amplifiers SS-ADC, Light Guide Structure, and Multiple-Accumulation Shutter," J. of Solid-State Circuits, pp. 219-228, Jan. 2018.

\* cited by examiner

*Primary Examiner* — Mark T Monk
(74) *Attorney, Agent, or Firm* — Kilpatrick Townsend & Stockton LLP

(57) ABSTRACT

Techniques are described for digital conversion of pixel signals in a CMOS image sensor (CIS). The CIS includes column-parallel analog-to-digital converters (ADCs), each having a programmable gain amplifier (PGA) supporting N gain settings. Each ADC can execute, for each gain setting (Gn) of the N gain settings, a respective reset phase conversion to obtain a respective baseline offset (BOn) associated with the Gn. A pre-decision value can be determined as a function of a pixel signal, the pre-decision value corresponding to a selected one of the gain settings (Gs). The pixel signal can be converted by using the pre-decision value to set a gain of the PGA to the Gs and obtaining a signal offset (SO). A digital pixel output can be computed for the pixel signal as a function of the SO and the BOs, wherein the BOs is the BOn corresponding to the Gs.

20 Claims, 9 Drawing Sheets

PIXEL-WISE GAIN-ADJUSTED DIGITAL CONVERSION FOR DIGITAL IMAGE SENSORS

FIELD

The invention relates generally to digital image sensors. More particularly, embodiments relate to pixel-wise gain-adjusted digital conversion using programmable gain amplifiers (PGAs) in complementary metal-oxide semiconductor (CMOS) digital image sensors.

BACKGROUND

Many electronic devices include cameras and other features that rely on digital image sensors. For example, most modern smartphones include one or more digital cameras that rely on digital image sensing hardware and software to capture and process images. Such applications often perform image sensing using a complementary metal-oxide semiconductor (CMOS) image sensor (CIS). Over time, consumers have desired increased performance from these image sensors, including higher resolution and lower noise. Further, particularly in portable electronic devices (e.g., with fixed battery capacity), it has been desirable to provide such features without adversely impacting power consumption and dynamic range. For example, analog power drives a significant, if not dominant, part of the power consumption of a modern CIS. As such, implementing a high-performance CIS in a portable electronic device can involve designing analog-to-digital converters (ADCs) and other components within strict power efficiency and noise constraints.

BRIEF SUMMARY OF THE INVENTION

Embodiments provide pixel-wise, programmable gain, digital conversion of pixel signals in a CMOS image sensor (CIS). The CIS includes column-parallel analog-to-digital converters (ADCs), each having a programmable gain amplifier (PGA) supporting N gain settings. Each ADC can execute, for each gain setting (Gn) of the N gain settings, a respective reset phase conversion to obtain a respective baseline offset (BOn) associated with the Gn. A pre-decision value can be determined as a function of a pixel signal, the pre-decision value corresponding to a selected one of the gain settings (Gs). The pixel signal can be converted by using the pre-decision value to set a gain of the PGA to the Gs and obtaining a signal offset (SO). A digital pixel output can be computed for the pixel signal as a function of the SO and the BOs, wherein the BOs is the BOn corresponding to the Gs.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many electronic devices include cameras and other features that rely on digital image sensors. For example, most modern smartphones include one or more digital cameras that rely on digital image sensing hardware and software to capture and process images. Such applications often perform image sensing using a complementary metal-oxide semiconductor (CMOS) image sensor (CIS).

Figure 1:
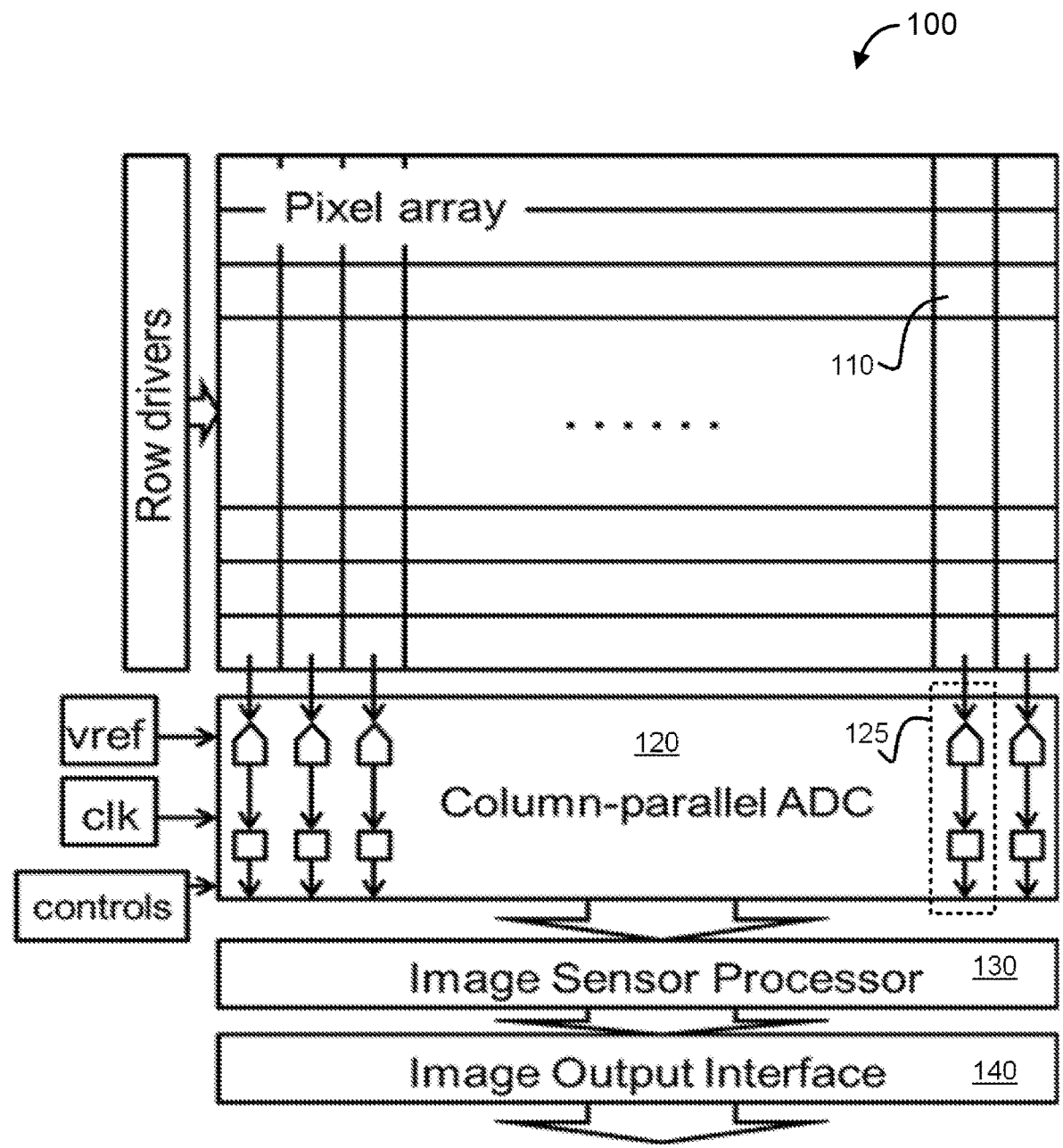
FIG. 1 shows an illustrative complementary metal-oxide semiconductor (CMOS) image sensor (CIS), as a context for various embodiments described herein.

FIG. 1 shows an illustrative complementary metal-oxide semiconductor (CMOS) image sensor (CIS) 100, as a context for various embodiments described herein. As illustrated, the CIS incudes a large number of photodetectors arranged as an array of pixels 110. The pixels are read row-by-row by a read block 120 made up of a set of column-parallel analog-to-digital converters (ADCs) 125. For example, optical information is captured by the array of pixels 110. To read out the data from the pixels 110, the rows are sequentially shifted, one at a time, to the read block 120. As each row reaches the read block 120 in turn, all the columns of the row are read in parallel by the ADCs 125. These operations are assisted by additional components, such as row drivers, column control circuitry, and various references signaling (e.g., to generate one or more reference voltages, reference clocks, etc.). Data from the column-parallel ADCs 125 can be processed by an image sensor processor 130, and output by an image output interface 140 (e.g., for use by downstream hardware and/or software components).

Over time, consumers have desired increased performance from these image sensors, including higher resolution (e.g., larger arrays with larger numbers of pixels 110) and lower noise. For example, some modern CISs include arrays with over 100 million pixels. Further, particularly in portable electronic devices (e.g., with fixed battery capacity), it has been desirable to provide such features without adversely impacting power consumption and dynamic range. For example, analog power drives a significant, if not dominant, part of the power consumption of a modern CIS, and consumers can be sensitive to features that reduce battery life. As such, implementing a high-performance CIS in a portable electronic device can involve designing analog-to-digital converters (ADCs) and other components within strict power efficiency and noise constraints. Some conventional implementations achieve desirable levels of power and noise, with desirable amounts of dynamic range, by using programmable gain amplifiers (PGAs) to adjust gain at a pixel level.

Figure 2:
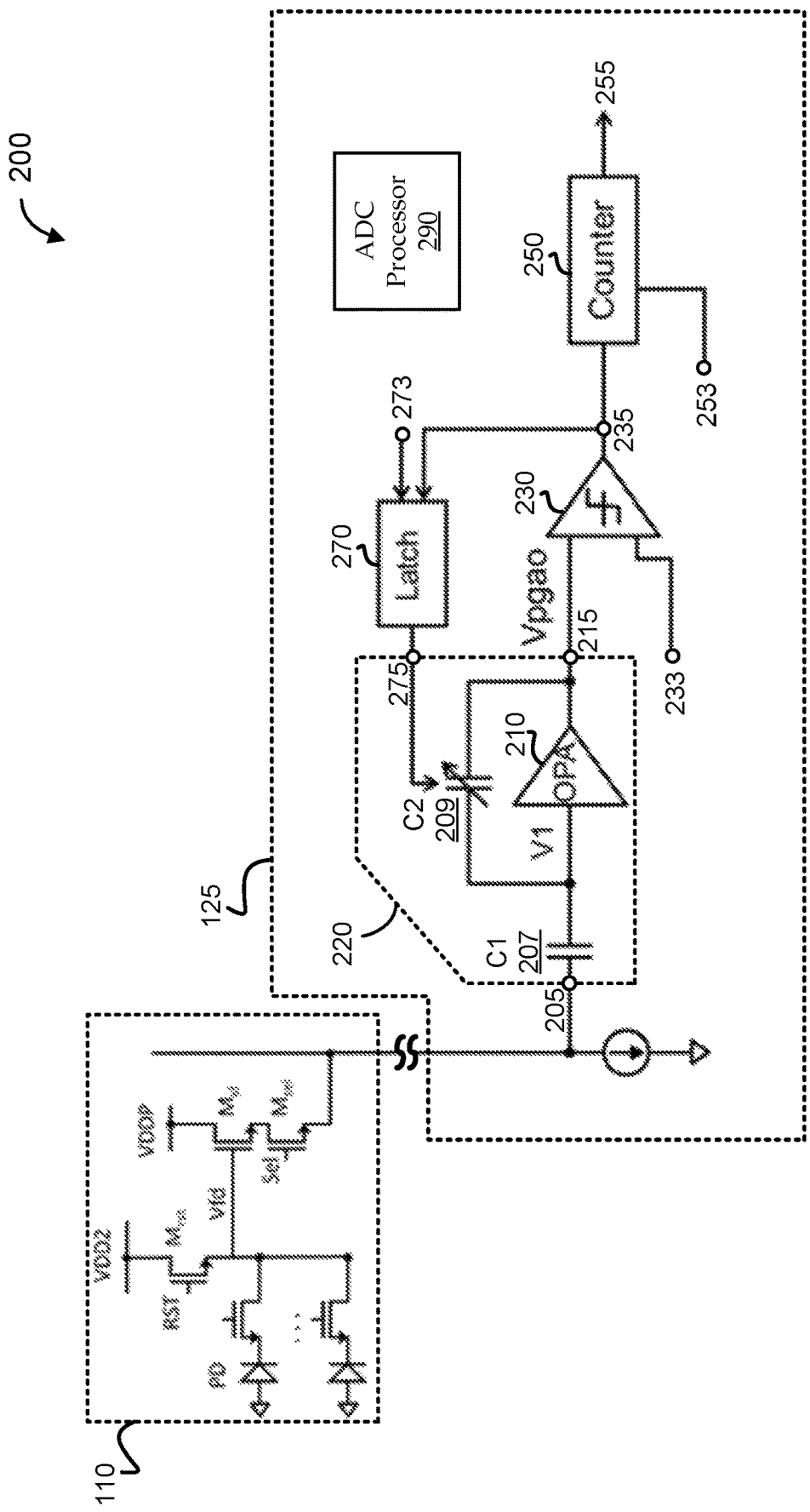
FIG. 2 shows a circuit block diagram an illustrative pixel coupled with an illustrative column-parallel analog-to-digital converters (ADCs), according to various embodiments.

FIG. 2 shows a circuit block diagram 200 an illustrative pixel 110 coupled with an illustrative column-parallel analog-to-digital converters (ADCs) 125, according to various embodiments. The illustrative pixel 110 circuit generally shows a set of photodiodes arranged to capture and store optical information, for example, indicating an amount of light detected at that pixel 110. The pixel 110 can be an implementation of one of the pixels 110 in one of the columns of an array of a CIS, such as shown in FIG. 1. The illustrated ADC 125 can be an implementation of one of the column-parallel ADCs 125 of the CIS, particularly the ADC 125 coupled with the column including the pixel 110.

As described above, each row of pixels 110 is sequentially shifted to the column-parallel ADCs 125 for readout. Accordingly, after each sequential shifting, each ADC 125 is provided with a pixel signal 205 corresponding to the output from a particular pixel 110 after having been shifted down its column until reaching the column-parallel ADC 125. As illustrated, the pixel signal 205 is received at an input of the PGA 220. The PGA 220 includes an operational amplifier 210 having an input capacitor network 207 (shown as a single fixed capacitor, C1) at its input, and having a feedback capacitor network 209 (shown as a single variable capacitor, C2) coupled between its output and its input to form a feedback path. In such a configuration, the total gain of the amplifier corresponds to the ratio of C1 to C2 (C1/C2, or −C1/C2, depending on the implementation). Thus, a PGA output signal 215 seen at the output of the PGA 220 corresponds to the pixel signal 205 amplified by the PGA 220 in accordance with the gain applied by the PGA 220. The coupling from PGA output signal 215 to the comparator input is DC in the plot, but it can be either DC or AC, depending on an implementation.

As described herein, when each row of pixels 110 is read by the column-parallel ADCs 125, the read-out by each ADC 125 includes a reset (or "auto-zeroing") phase and a signal (or "transmit," or "TX/signal") phase. Each ADC 125 includes a programmable gain amplifier (PGA) 220. During the reset phase, a number of reset phase conversions are performed to obtain respective baseline offsets associated with multiple gains settings for the PGA 220. For example, the PGA 220 may support a high-gain setting and a low-gain setting, and/or the PGA 220 may support any suitable additional or alternative gain settings. During the signal phase, a pixel signal 205 output from the pixel 110 is estimated to determine a pre-decision value, and the pre-decision value corresponds to a selected one of the gain settings supported by the PGA 220. The gain of the PGA 220 can then be set in accordance with pre-decision value (i.e., using the corresponding gain setting), and the pixel signal 205 can be converted by the PGA 220 to obtain a signal offset. The signal offset and the respective baseline offset corresponding to the selected gain setting can then be used to compute a digital pixel output for the pixel signal 205.

As illustrated, the ADC 125 can include an ADC processor 290 to direct implementation of various features. The processor 290 can include any suitable processor, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof, or any portion thereof. The processor 290 can control some or all components of the ADC 125. For example, the processor 290 can control operations of the PGA 220 by controlling whether it receives the pixel output signal 205 directly or some other signal (e.g., an auto-zero signal), and by selecting the gain setting to be used by the PGA 220 (e.g., directly, by controlling one or more other signals, by responding to one or more other signals, etc.). Similarly, as described herein, the processor 290 can control operation of a comparator 230 (e.g., by controlling ramping up of a reference voltage signal 233 at a comparator 230 input), of a latch 270 (e.g., by actuating and de-actuating an enable signal 273), of a counter 250 (e.g., by controlling a clocking signal 253), etc. Though not explicitly shown, some implementations further have one or more additional types of storage, such as registers, latches, solid state memories, etc., on which to store various threshold values, baseline offset values, signal offset values, and other suitable information; and memory operation relating to such storage can be controlled by the processor 290.

In effect, at each pixel readout, a pixel signal level can be estimated to obtain a pre-decision, and the pre-decision can be used for pixel-wise adjustment of the PGA gain. For example, high gain is applied to low-level signals to reduce noise, and low gain is applied to high-level signals to avoid overloading components. Present day high-end CIS (CMOS image sensor) is moving into higher resolution and lower noise. At the same time, power consumption and dynamic range are wanted not to be compromised, especially in mobile devices. Analog power is a significant, if not dominant, part of the CIS power consumption, therefore, power efficient and low noise ADC design is critical in a high performance CIS product. Implementations of embodiments described herein can provide a reduction in readout noise, while maintaining high dynamic range, relaxing downstream circuits, and reducing overall power (as compared to implementations without a PGA gain stage).

Conventional CIS implementations tend to use a fixed gain amplifier, or an amplifier having gain that is programmed by a system once for a whole image, or the like. In limited cases, conventional CIS approaches have included some pixel-wise gain adjustment. However, such conventional implementations tend to have various limitations, such as pronounced linearity errors. Further, such conventional implementations tend to rely on adding complex hardware, tend not to be robust with changes in operating conditions (e.g., over time and temperature), and tend to contribute to other undesirable effects (e.g., vertical fixed-pattern noise).

Figure 3:
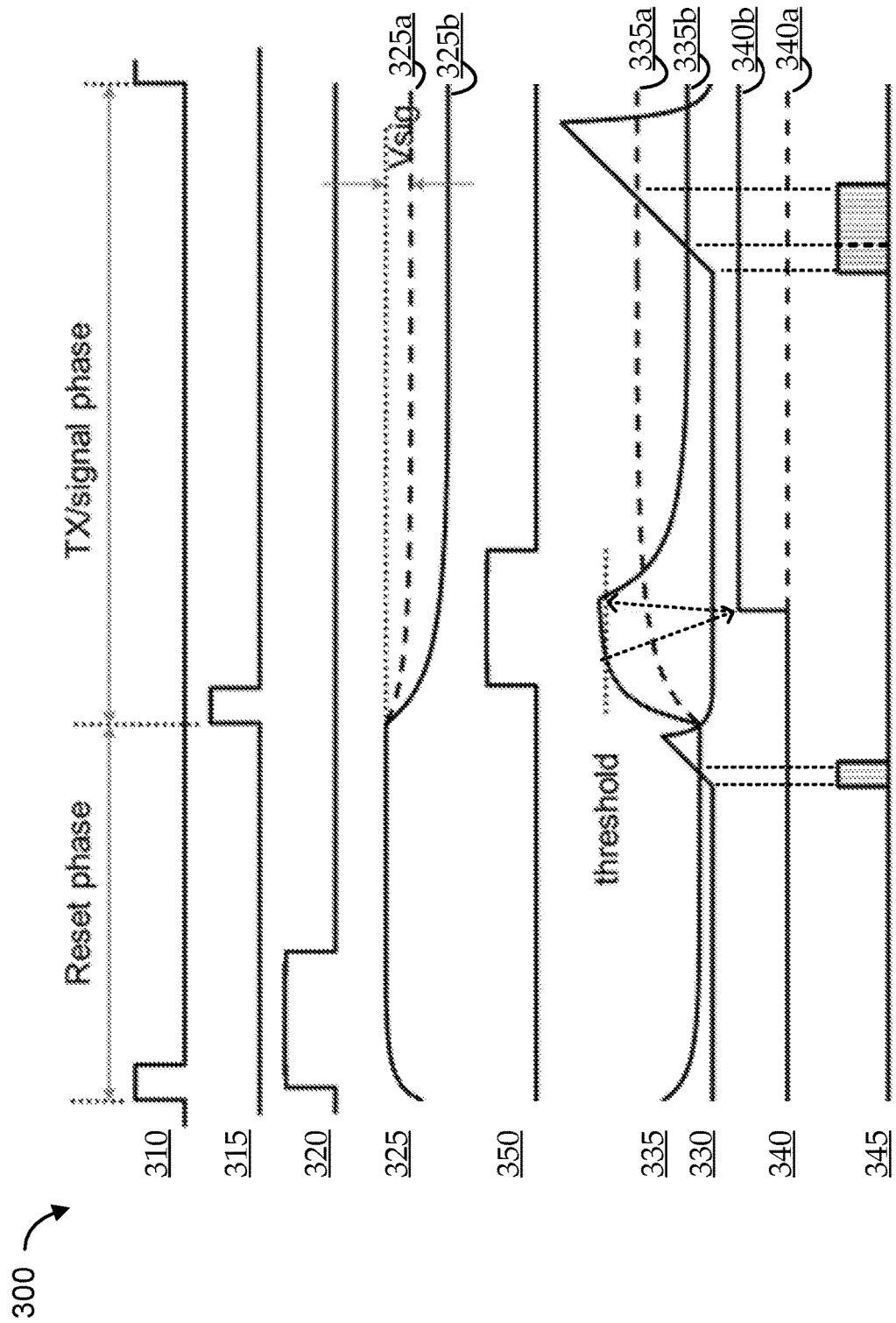
FIG. 3 shows an illustrative timing diagram for a conventional pixel readout.

For the sake of added clarity, FIG. 3 shows an illustrative timing diagram 300 for a conventional pixel readout. The timing diagram 300 shows a reset phase and a signal phase. As shown, a reset trigger signal 310 can trigger starting of the reset phase, and a signal trigger signal 315 can trigger start of the signal phase. The reset signal 310 forces the pixel signal 325 to a predefined reset value, and an auto-zero signal 320 forces a PGA output signal 335 to a different predefined low level (auto-zeroing circuits not shown in plot for simplicity). The PGA is also set to a high-gain condition. Notably, the PGA output signal 335 does not drop to zero, to provide proper bias for circuits and margin for some natural offset and auto-zeroing error. After the pixel signal 325 and the PGA output signal 335 settle to their auto-zero levels, a reference voltage 330 is triggered to begin ramping up (e.g., after starting at zero, or some known voltage level below the auto-zeroed PGA output signal 335). Concurrently, a counter output signal 345 tracks the time it takes for the reference voltage 330 level to cross the PGA output signal 335 level. As the reference voltage 330 ramps up, it can be compared against the auto-zeroed PGA output signal 335; when the reference voltage 330 reaches the level of the auto-zeroed PGA output signal 335, the counting can cease. Upon ceasing counting, the counter output signal 345 (e.g., a final binary count, a pulse width, etc.) corresponds to a baseline offset of the auto-zeroed PGA output signal 335. For example, the amount of baseline offset is predictably correlated to (e.g., proportional to) the time it will take at a given slope for the reference voltage 330 level to ramp up to the auto-zeroed PGA output signal 335 level.

After the baseline offset is obtained, the signal phase begins, and the actual pixel signal 325 is passed through to the PGA. A pre-decision sub-phase is triggered by a pre-decision enable signal 350. The PGA is maintained in its high-gain state, and the PGA output signal 335 is monitored in relation to a pre-decision threshold level 337 (e.g., set by an external limit circuit). If the pixel signal 325 is a low-light signal (represented by pixel signal 325 settling to level 325a), the PGA output signal 335 will tend not to reach the pre-decision threshold level 337 even at high gain. However, if the pixel signal 325 is a high-light signal (represented by pixel signal 325 settling to level 325b), the PGA output signal 335 will tend briefly to exceed the pre-decision threshold level 337 at high gain. A pre-decision output signal 340 is generated responsive to this pre-decision sub-phase (e.g., as a logic HIGH, indicated by curve 340b, for high-light signals, and as a logic LOW, indicated by curve 340a, for low-light signals). The gain of the PGA is set responsive to this pre-decision output signal 340. For example, estimation of the signal as low-light results in a pre-decision that drives a high-gain setting for the PGA, and estimation of the signal as high-light results in a pre-decision that drives a low-gain setting for the PGA.

These gain adjustments are then applied to the PGA and reflected in the PGA output signal 335, as indicated. For example, in a low-light condition, the PGA output signal 335 tracks the low-light pixel signal 325a with high gain applied by the PGA (shown as curve 335a); in a high-light condition, the PGA output signal 335 tracks the high-light pixel signal 325b with high gain applied by the PGA (shown as curve 335b). The pixel signal 325 can then be converted using the adjusted gain setting. Again, the reference voltage 330 can be ramped up and compared against the PGA output signal 335 to obtain a count that indicates a signal offset for the PGA output signal 335 (illustrated by counter output signal 345).

Notably, this signal offset level corresponds to the pixel signal 325 level, but also includes the baseline offset of the PGA determined in the reset phase. Some approaches mitigate this effect by effectively subtracting out the baseline offset during the final conversion of the signal. However, such subtracting tends to generate linearity error. For example, the baseline offset is conventionally determined using a high-gain setting for the PGA, but the PGA may manifest a different baseline offset when in a low-gain setting. If the digital conversion is ultimately performed using the low-gain setting, the conversion offset may be different from the baseline offset.

Figure 4:
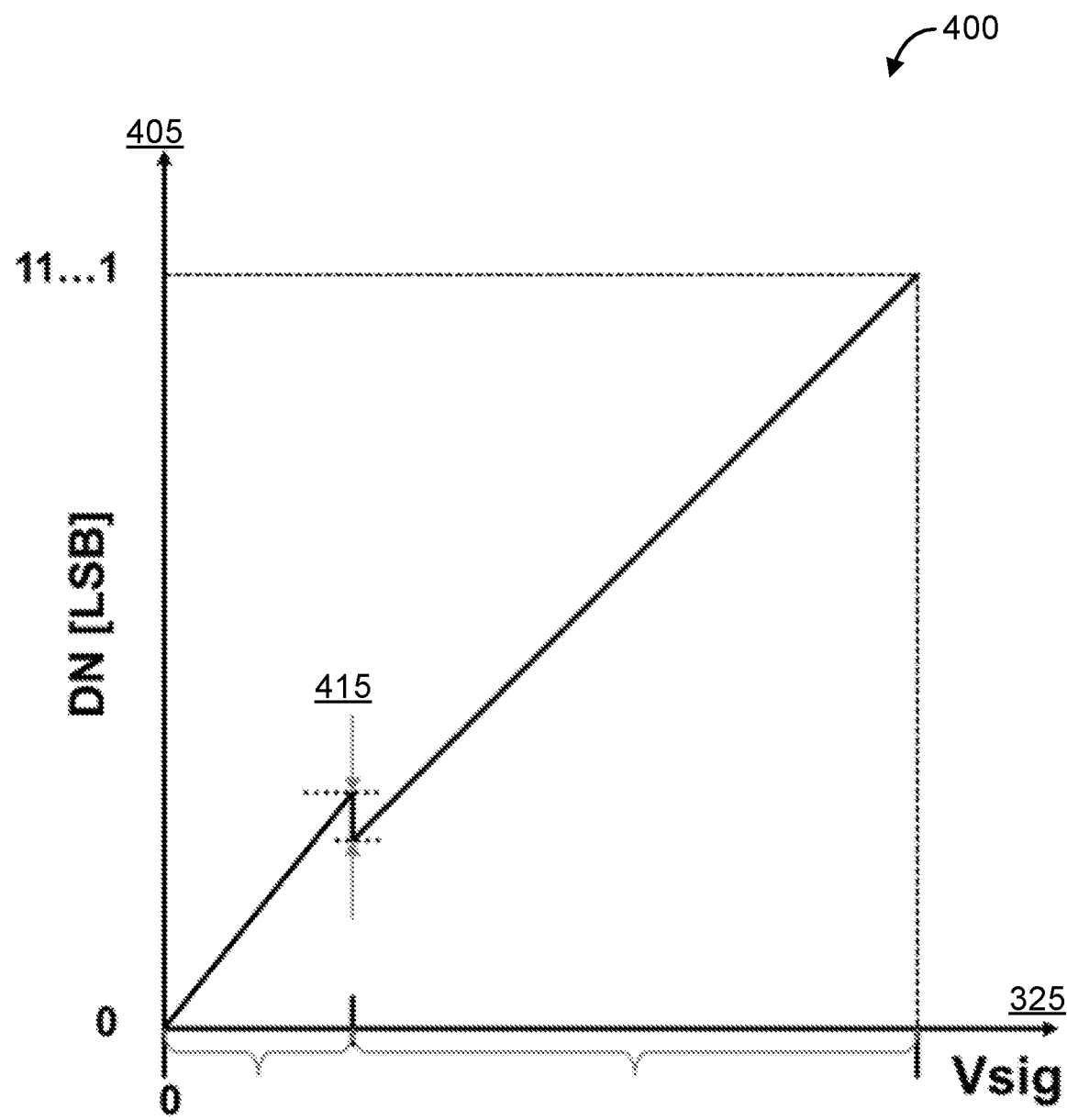
FIG. 4 shows an illustrative plot of the final converted pixel output versus the pixel signal using conventional pixel-wise gain adjustment, such as described in FIG. 3.

For example, FIG. 4 shows an illustrative plot 400 of the final converted pixel output 405 versus the pixel signal 325 using conventional pixel-wise gain adjustment, such as described in FIG. 3. The plot 400 illustrates a high-gain range 410 and a low-gain range 420. When the pixel signal 325 is relatively low, high gain is applied to achieve the converted pixel output 405; when the pixel signal 325 is relatively high, low gain is applied to achieve the converted pixel output 405. When the pixel signal 325 is right at the pre-decision threshold level 337 (Vsig=Vth_pred), there tends to be a linearity error 415 manifesting as a discontinuity. The linearity error 415 can correspond to a difference between the high-gain baseline offset manifest by the PGA and the low-gain baseline offset manifest by the PGA. In addition to the offset mismatch error, the relative variation in gain_ratio=high-gain/low-gain, gratio_err=gain_ratio/gain_ratio_ideal−1, can introduce nonlinear error of −gratio_err*Vth_pred at Vsig=Vth_pred.

Some conventional approaches seek to compensate for the relative large linearity error 415. For example, two well-controlled signals are used to calibrate the offset difference and gratio_err, and calibration codes are individually stored for each ADC. Digital correction is carried out during real-time image capturing readout. Such compensation tends to be complex and involves additional correction hardware. Further, such compensation tends not to be robust with offset shifts over temperature and time of use. Moreover, un-canceled analog offset and gain error can contribute to vertical fixed-pattern noise (FPN) due to mismatch between column ADCs, many applications have strict FPN design constraints (e.g., required to be 20 dB below, 0.1× in magnitude, the related pixel random noise level). Because of these practical limitations, conventional techniques are considered to be unattractive for practical image sensor product implementations.

Figure 5:
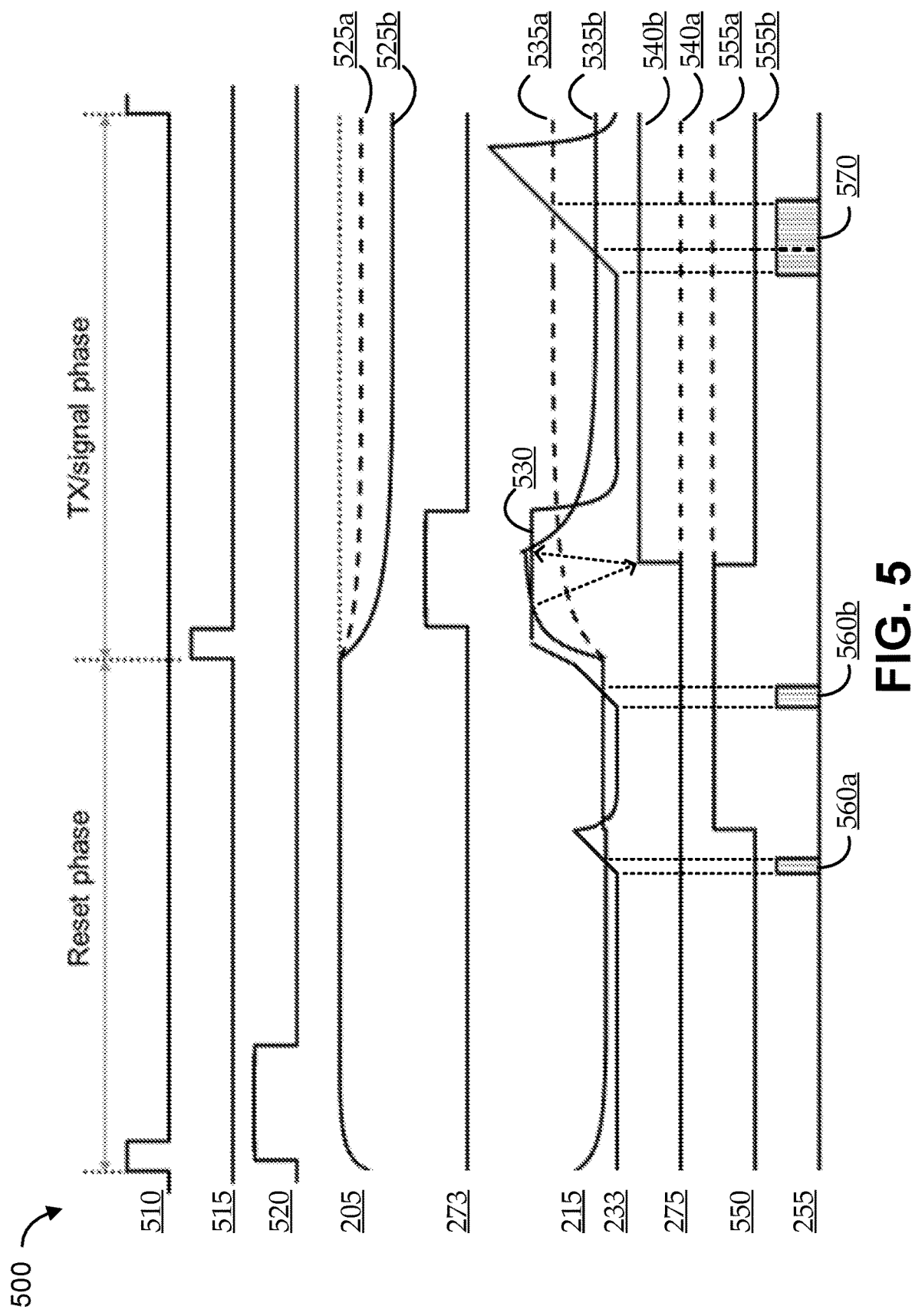
FIG. 5 shows an illustrative timing diagram for pixel-wise gain-adjusted readout and conversion, according to various embodiments.

Embodiments described herein provide a novel approach for pixel-wise gain-adjusted conversion that avoids limitations of conventional approaches. FIG. 5 shows an illustrative timing diagram 500 for pixel-wise gain-adjusted readout and conversion, according to various embodiments. For added context, the timing diagram 500 of FIG. 5 is described in context of the block diagram 200 of FIG. 2. The timing diagram 500 shows a reset phase and a signal phase. As shown, a reset trigger signal 510 can trigger starting of the reset phase, and a signal trigger signal 515 can trigger start of the signal phase.

The PGA 220 can include N possible gain settings, where N is an integer greater than one. To avoid over-complicating the figure, the timing diagram 500 and description assume that N is two, such that the PGA 220 includes two gain settings: a high-gain setting, and a low-gain setting. At the start of the reset phase, the PGA 220 can be set to a first of its gain settings. In the illustrated case, the PGA 220 is first set to a low-gain setting, as illustrated by PGA gain setting signal 550. The reset signal 510 forces the pixel signal 205 to a predefined reset value, and an auto-zero signal 520 forces the PGA output signal 215 to a different predefined low level (auto-zeroing circuits not shown in plot for simplicity). As described above, the PGA output signal 215 does not drop to zero to provide proper bias for circuits and margin for some natural offset and auto-zeroing error. This offset is a baseline offset of the PGA 220 when set to the first gain setting.

As shown in FIG. 2, the PGA output signal 215 is coupled with one input of a comparator 230, the other input of the comparator 230 is coupled with a reference voltage 233, and the output of the comparator 230 is a comparator output signal 235. The comparator output signal 235 is coupled with a counter 250 that is clocked according to a counter clock signal 253. The output of the counter 250 is counter output signal 255. The comparator output signal 235 is also coupled with an input to a latch 270 that is enabled (e.g., gated) by a pre-decision enable signal 273, and the output of the latch 270 is the pre-decision output signal 275. The pre-decision output signal 275 can then be coupled with a control input to the variable feedback capacitor 209 of the PGA 220, such that the gain of the PGA 220 can be controlled responsive to the pre-decision output signal 275.

After the pixel signal 205 and the PGA output signal 215 settle to their auto-zero levels in the first gain setting condition, the reference voltage 233 at the input to the comparator 230 is triggered to begin ramping up (e.g., after starting at zero, or some known voltage level below the auto-zeroed PGA output signal 215). Concurrently, the counter 250 can begin counting, as indicated by counter output signal 255. As the reference voltage 233 ramps up, it is compared against the auto-zeroed PGA output signal 215. The comparator output signal 235 can flip in response to the reference voltage 233 reaching (e.g., crossing) the level of the auto-zeroed PGA output signal 215. For example, the comparator output signal 235 can transition from '1' to '0', or from '0' to '1', generating a transition edge. This transition edge can trigger the counter 250 to cease counting. Upon ceasing counting, the counter output signal 255 (e.g., a final binary count, etc.) corresponds to a first baseline offset 560a of the auto-zeroed PGA output signal 215 corresponding to the PGA 220 being set to the first gain setting. This first baseline offset 560a can be stored in a register, memory location, or in any suitable manner.

Subsequently, the above reset phase conversion (i.e., setting the PGA 220 to a particular gain setting and obtaining a respective baseline offset 560 corresponding to that gain setting) can be repeated for each of the N gain settings supported by the PGA 220. In the illustrated case, the PGA 220 is switched to a second (e.g., high) gain setting as illustrated by PGA gain setting signal 550. In this configuration, the reference voltage 233 at the input to the comparator 230 is reset to an initial level and again triggered to begin ramping up; and the counter 250 is concurrently triggered to reset and restart counting, as indicated by counter output signal 255. In the same manner as described for the first gain setting, the comparator 230 and the counter 250 are used to obtain and record a second baseline offset 560b of the auto-zeroed PGA output signal 215 corresponding to the PGA 220 being set to the second gain setting. By using the same comparator 230, the same counter 250, the same reference voltage 233 and corresponding ramp slope, the same counter clock signal 253, etc., implementations can ensure that each respective baseline offset 560, though obtained and recorded under different gain conditions, are otherwise comparable.

After the multiple respective baseline offsets 560 are obtained, the signal phase begins, and the actual pixel signal 205 is passed through to the PGA 220. A pre-decision sub-phase is used to estimate the pixel signal 205 to generate a pre-decision for controlling the gain setting of the PGA 220. In some embodiments, rather than using an externally set pre-decision threshold level (e.g., as in FIG. 3), the reference voltage 233 is set to a high level corresponding to a pre-decision threshold level 530. For example, the reference voltage 233 is set to a predetermined threshold voltage times the high-gain level applied by the PGA 220. The PGA 220 is set to (or maintained in) its high-gain setting condition. As the pixel signal 205 settles, the PGA output signal 215 tracks the pixel signal 205 with the high gain applied. In environments using the reference voltage 233 to establish the pre-decision threshold level 530, the same comparator 230 can be used to compare the PGA output signal 215 in relation to the pre-decision threshold level 530. If the pixel signal 205 is a low-light signal (represented by pixel signal 205 settling to level 525a), the PGA output signal 215 will tend not to reach the pre-decision threshold level 530 even at high gain. However, if the pixel signal 205 is a high-light signal (represented by pixel signal 205 settling to level 525b), the PGA output signal 215 will tend briefly to exceed the pre-decision threshold level 530 at high gain. As illustrated by the two arrows, exceeding of the pre-decision threshold level 530 at high gain can cause the pre-decision output signal 275 to record a high-light pre-decision, thereby causing the gain to switch to a low-gain setting, thereby causing the PGA output signal 215 to begin to drop under the lower applied gain. Using the same comparator 230 to make the pre-decision (e.g., rather than a separate limit circuit to set and monitor a pre-decision threshold level) can provide various features. One feature is that using the same comparator 230 avoids relying on additional hardware. Another feature is that using the same comparator 230 can cancel any offset generated by the comparator 230 in the reset phase, thereby increasing the precision of the pre-decision threshold level 530.

During this sub-phase, the pre-decision enable signal 273 can enable the latch 270 to record the value of the comparator output signal 235. As such, when the pre-decision enable signal 273 is no longer actuated, the latch 270 has the pre-decision output signal 275 at its output, which corresponds to the comparison between the PGA output signal 215 and the pre-decision threshold level 530 as indicated by the comparator output signal 235. For example, if the PGA output signal 215 crosses the pre-decision threshold level 530 during the time when the pre-decision enable signal 273 is actuated, the pre-decision output signal 275 can be latched to a '1' (e.g., logic HIGH, indicated by curve 540b); if the PGA output signal 215 does not cross the pre-decision threshold level 530 during the time when the pre-decision enable signal 273 is actuated, the pre-decision output signal 275 can be latched to a '0' (e.g., logic LOW, indicated by curve 540a).

The gain of the PGA 220 is set responsive to this pre-decision output signal 275. For example, a low-light pixel signal 205 following curve 525a results in a pre-decision output signal 275 of level 540a, thereby driving a high-gain setting for the PGA 220 (shown as 555a); a high-light pixel signal 205 following curve 525b results in a pre-decision output signal 275 of level 540b, thereby driving a low-gain setting for the PGA 220 (shown as 555b). These gain adjustments are then applied to the PGA 220 and reflected in the PGA output signal 215, as indicated. For example, in a low-light condition, the PGA output signal 215 tracks the low-light curve 525a with high gain applied by the PGA 220 (shown as curve 535a); in a high-light condition, the PGA output signal 215 tracks the high-light curve 525b with high gain applied by the PGA 220 (shown as curve 535b).

The pixel signal 205 can then be converted using the adjusted gain setting (e.g., indicated by PGA gain setting signal 550 at level 555a or level 555b). Again, the reference voltage 233 can be ramped up and compared against the PGA output signal 215, and a counter can be used to indicate a converted level of the PGA output signal 215 as a signal offset 570. As described above, this signal offset 570 corresponds to a level of the pixel signal 205, but also includes the baseline offset 560 of the PGA 220 corresponding to the gain setting used in the conversion. The baseline offset 560 contribution can be subtracted out of the final conversion to obtain a converted pixel output (DN). For example, digital correlated double sampling (CDS) is used to compute DN as a difference between the signal offset 570 (SO) and the baseline offset 560 (BO) divided by an ideal gain ratio (IGR). Notably, as each supported gain setting is associated with a respective obtained and recorded baseline offset 560, the CDS can be performed using the baseline offset 560 corresponding to the gain setting that was used in the conversion. For example, for gain setting Gn, the final digital CDS operation can be calculated as: DN=(SO−BOn)/GM. Embodiments can use a same reference ramp slope for all conversions to eliminate any slope matching issue. Because the digital CDS result is the difference between two conversion results generated at the same signal path configuration with the same offset (i.e., the respective BO used for the signal conversion is the same one that is canceled by the CDS operation), the baseline offset is canceled without the linearity error described above with reference to conventional approaches.

Figure 6B:
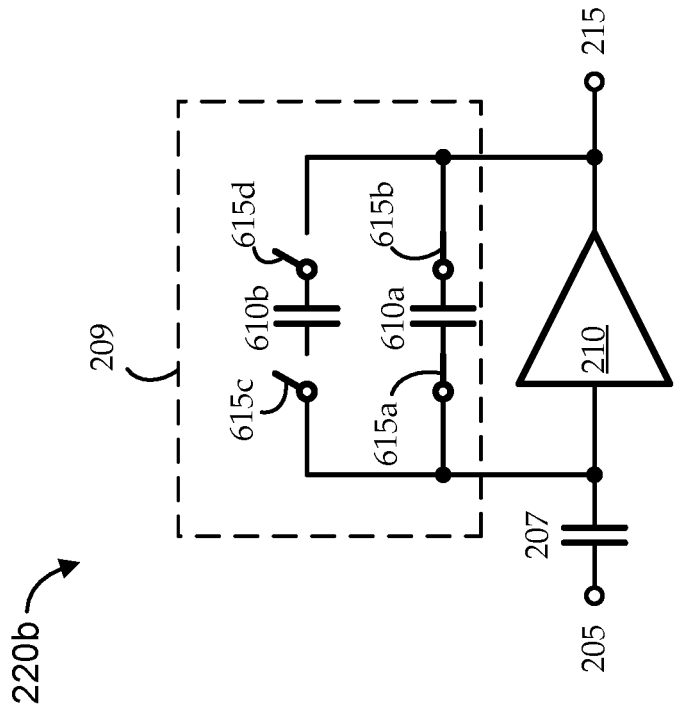
FIGS. 6A and 6B show an illustrative implementation of a programmable gain amplifier (PGA) supporting multiple gain settings, according to various embodiments.
Figure 6A:
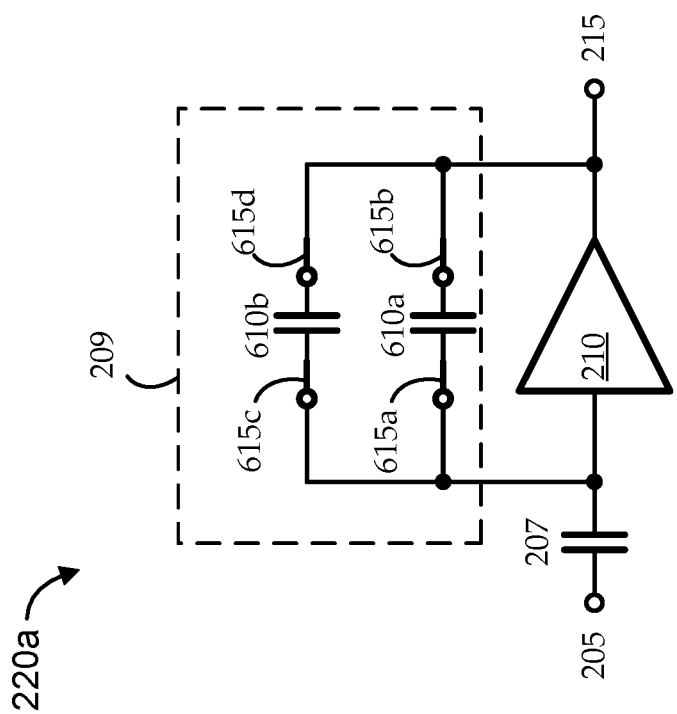

As described herein, the PGA 220 can be designed to support multiple gain settings. FIGS. 6A and 6B show an illustrative implementation of a programmable gain amplifier (PGA) 220 supporting multiple gain settings, according to various embodiments. FIG. 6A shows the PGA 220a in a low-gain configuration, and FIG. 6B shows the PGA 220b in a high-gain configuration. The PGA 220 illustrated in FIGS. 6A and 6B can be an implementation of the PGA 220 shown in FIG. 2. As illustrated, the PGA 220 receives a pixel signal 205 and outputs a PGA output signal 215. The PGA 220 includes an operational amplifier 210 having an input capacitor network 207 (shown as a single fixed capacitor, C1) at its input, and having a feedback capacitor network 209 (C2) coupled between its output and its input to form a feedback path. In such a configuration, the total gain of the amplifier corresponds to the ratio of C1 to C2 (C1/C2, or −C1/C2, depending on the implementation). Thus, a PGA output signal 215 seen at the output of the PGA 220 corresponds to the pixel signal 205 amplified by the PGA 220 in accordance with the gain applied by the PGA 220.

As illustrated, the feedback capacitor network 209 can include a set of multiple capacitors 610 in parallel, each configured to be selectively switched into or out of the network. In some implementations, the capacitors 610 are unit capacitors implemented as either MOM (Metal-Oxide-Metal) or MIM (Metal-Insulator-Metal) capacitors for matching purposes. For example, the feedback capacitor network 209 includes a first feedback capacitor 610a (C2a) and a second feedback capacitor 610b (C2b). In a low gain setting (e.g., illustrated in FIG. 6A), both the first feedback capacitor 610a and the second feedback capacitor 610b are switched into the feedback path; and the gain of the PGA 220a can be computed as C1/(C2a+C2b). In a high gain setting (e.g., illustrated in FIG. 6B), only the first feedback capacitor 610a is switched into the feedback path (the second feedback capacitor 610b is switched out of the feedback path); and the gain of the PGA 220b can be computed as C1/C2a. As such, the gain ratio can be computed as 1+C2b/C2a.

The feedback capacitors 610 can be switched into or out of the feedback path in any suitable manner. For example, some or all of the feedback capacitors 610 can have a switch 615 on one or both sides. In some implementation, the first feedback capacitor 610a is always in the feedback path and is not coupled via switches (switches 615a and 615b are not included in the circuit). However, inclusion of the switches even in such a fixed path can help ensure proper matching between the parallel legs of the feedback capacitor network, resulting in better performance. In some implementations, each feedback capacitor 610 includes a switch 615 only on one of its sides (e.g., switched 615a and 615c, or switches 615b and 615d, are removed). However, including switches on both sides of the feedback capacitors 610 can improve analog performance in some implementations. Though no control signal is explicitly shown, the switches 615 can be controlled in any suitable manner. In some implementations, referring to FIG. 2, the switches are controlled responsive to the pre-decision output signal 275. For example, the switches 615 are configured, so that switches 615a and 615b always remain closed, while switches 615c and 615d are open when the pre-decision output signal 275 is '0' and closed when the pre-decision output signal 275 is '1'. In such an example, estimating that the pixel signal 205 is a low-light signal can result in a pre-decision output signal 275 of '0', causing switches 615c and 516d to open, thereby configuring the PGA 220 in a high-gain setting; estimating that the pixel signal 205 is a high-light signal can result in a pre-decision output signal 275 of '1', causing switches 615c and 516d to close, thereby configuring the PGA 220 in a low-gain setting.

Designing the PGA 220 as shown in FIGS. 6A and 6B can provide various features. One feature is that gain ratio errors, and other related concerns, can be mitigated by close matching of the parallel feedback capacitor paths. For example, using closely matched feedback capacitors 610 and closely matched configurations and implementations of switches 615 can result in relatively low gain ratio error. Some implementations further reduce error and/or otherwise improve performance with well-planned pre-decision threshold level selection.

Figure 7:
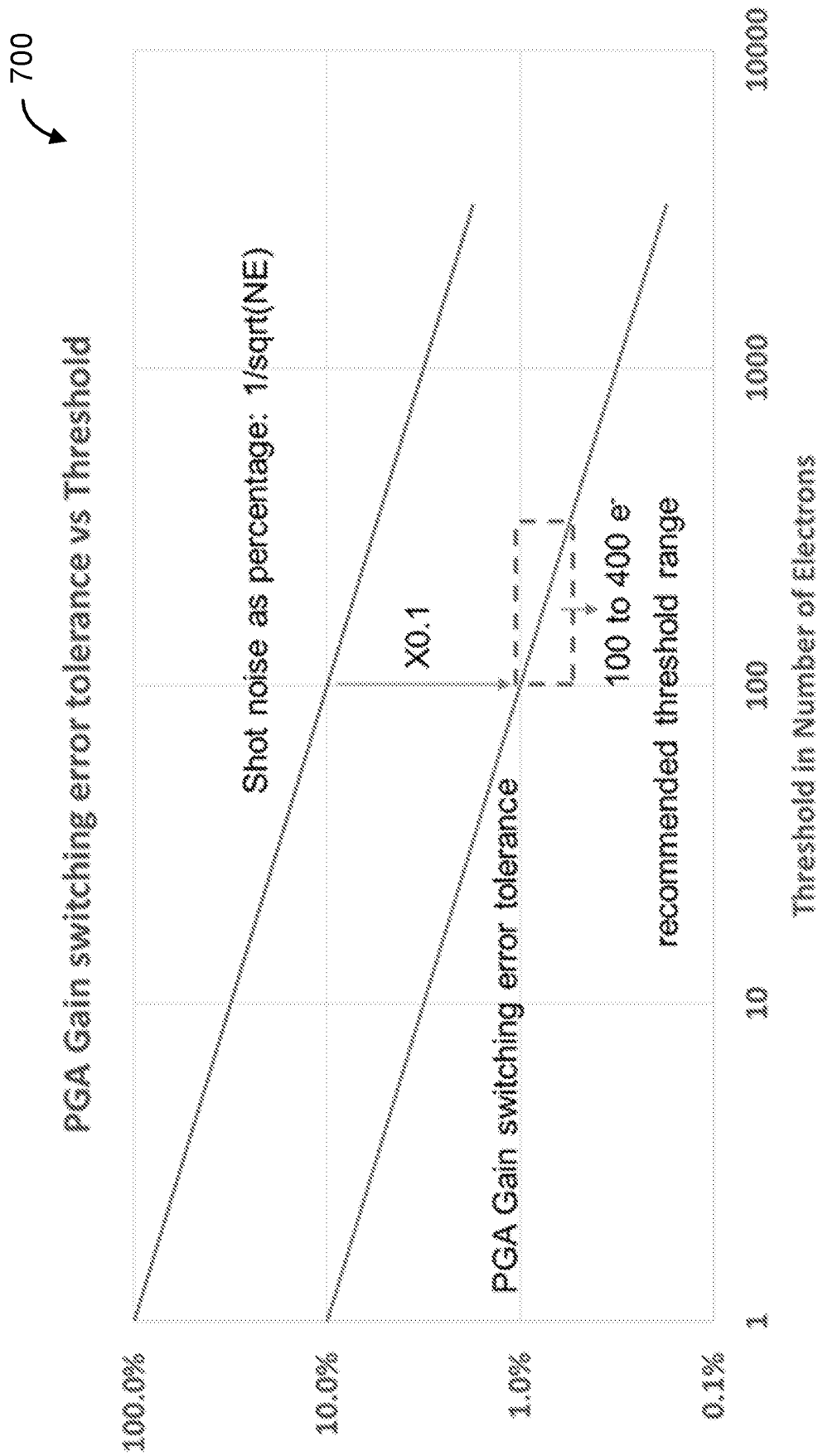
FIG. 7 shows a plot of PGA gain switching error tolerance versus pre-decision threshold level in number of electrons.

The pixel signal in a CIS is generated by electrons collected in the pixel photodiode over an exposure time. The collected electron signal has inherent shot noise with a variance level equal to the number of electrons (NE) and a relative error of sqrt(NE)/NE=sqrt(NE). As a rule of thumb, a linearity error of 20 dB below (e.g., 0.1× the magnitude of) the shot noise is insignificant and can be tolerated. For example, FIG. 7 shows a plot 700 of PGA gain switching error tolerance versus pre-decision threshold level in number of electrons. For example, a threshold level selected to be in the range of 100 to 400 electrons provides a gain deviation tolerance of 1 to 0.5 percent. Using carefully matched feedback capacitors (e.g., achievable with MOM or MIM capacitors) can yield a PGA gain switching error of less than 0.5 percent. Such an error may be low enough that no gain calibration is needed with a carefully chosen threshold value (e.g., of around 100 to 400 electrons, such as 250 electrons). At a threshold low limit (e.g., 100 electrons), shot noise can be much higher than readout noise; while at a threshold high limit (e.g., 400 electrons), the gain error tolerance can be below 0.5 percent. The listed threshold values 400 may be adjusted with respect to capacitor matching characteristics and/or other design features. It can be desirable to have a wide enough threshold range to account for auto-zero errors in the ADC 125 (a range of 100 to 400 electrons, with a middle value of 250 electrons, can be wide enough). The value of the threshold in voltage can be computed according to a conversion gain from electrons to voltage. For example, at a gain of 0.15 millivolts per electron, a range of 100 to 400 electrons translates to a range of approximately 15 to 60 millivolts at the pixel output.

Figure 8:
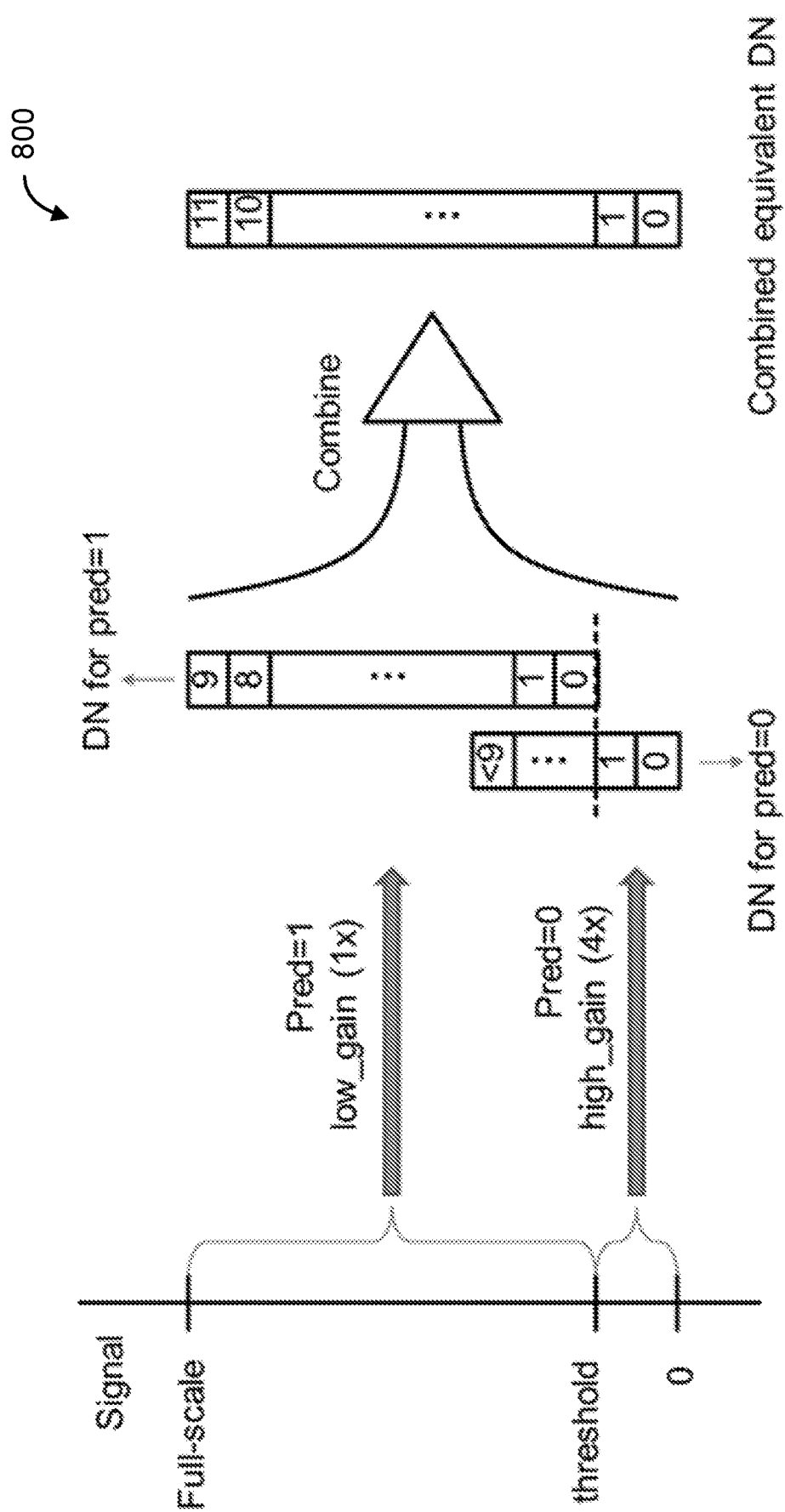
FIG. 8 shows an illustrative counter implementation, according to various embodiments.

In some embodiments, a carefully selected gain ratio can facilitate certain counter-related features. FIG. 8 shows an illustrative counter implementation 800, according to various embodiments. The counter implementation 800 assumes the PGA 220 supports two gain settings: a low-gain setting corresponding to 1×gain; and a high-gain setting corresponding to 4× gain. As described above, by the time the signal is being converted, a pre-decision has already been performed, such that the system knows whether it will be converting a low-light pixel signal 205 with high gain, or converting a high-light pixel signal 205 with low gain. It can be known that a low-light pixel signal 205 being converted with high gain will fall within a particular first range of counter output signal 255 values, while a high-light pixel signal 205 being converted with low gain will fall within a particular second range of counter output signal 255 values. Although the first and second ranges may overlap, the first range will predictably start at a lower value and be smaller than the first range. Some embodiments can generally support N gain settings, wherein N is a positive integer greater than or equal to two. In such embodiments, across all the N gain settings, the signal output (SO) has a full-scale range of 0 to $(2^{\wedge}M)-1$; a first of the gain settings is associated with a first portion of the full-scale range extending from 0 to a first intermediate value of the full-scale range; a second of the gain settings is associated with a second portion of the full-scale range extending from a second intermediate value of the full-scale range to $(2^{\wedge}M)-1$, the second portion overlapping the first portion; and the counter has a base counter resolution of K bits, wherein K=M−X. In such embodiments, converting the pixel signal includes: with the gain setting corresponding to the first of the gain settings, the counter is configured to represent values from 0 to $2^{\wedge}K)-1$, the first intermediate value being less than $2^{\wedge}K)-1$; and with the gain setting corresponding to the second of the gain settings, the counter is configured to represent values from $2^{\wedge}X$ to $2^{\wedge}M)-1$, the second intermediate value being greater than $2^{\wedge}X$.

Suppose, for example, that the full scale range of the signal output (including both the first range and the second range) corresponds to a 12-bit counter range (i.e., values from $000000000000_2$ to $111111111111_2$, or $0_{10}$ to $4095_{10}$). The least significant bits (e.g., two or more) may be needed to describe signal output values in the first range, but the first range may never approach anything close to the top of the 12-bit range. However, if it can be predicted that the second range will always begin at a level with an inherent shot noise level well above the least significant bits such as $11_2$, the additional resolution provided by those least significant bits may be unnecessary to described the second range. As such, embodiments can use such knowledge relating to the pre-decision output signal 275 to relax counter requirements. As illustrated, rather than using a 12-bit counter, a 10-bit counter is shown. When operating in the high-gain mode, the 10-bit counter can be used to represent values from decimal '0' ('0000000000') to decimal '1023' ('1111111111'), though the first range is likely much smaller. When operating in the low-gain mode, the output of the same 10-bit counter can be shifted by two bits. As such, the all counter output values are effectively treated like the output of a 12-bit counter with the two least significant bits fixed (e.g., at '0'). For example, in such a configuration, a counter value of '0000000000' now can represent a decimal value of '4', and a counter value of '1111111111' can represent a decimal value of '4095'. In this way, the 10-bit counter can effectively have a 12-bit resolution. Further, the quantization noise in the counter is relaxed by four times, and the number of counter transitions is reduced to one-fourth for signals larger than the threshold level, therefore reducing the digital counting power to roughly one-fourth.

Figure 9:
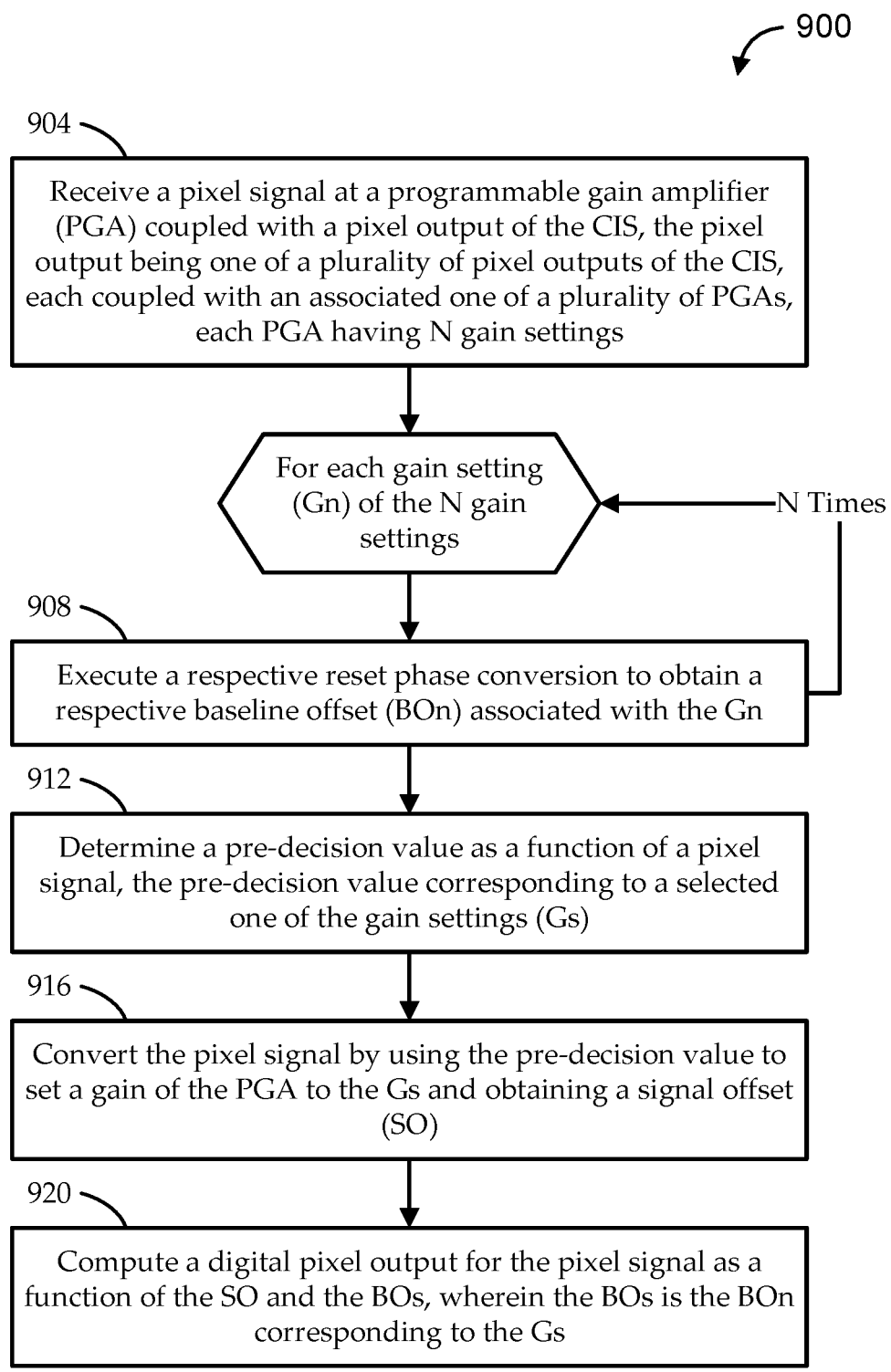
FIG. 9 shows a flow diagram of a method for generating digital pixel-wise outputs from a CMOS image sensor (CIS), according to various embodiments.

FIG. 9 shows a flow diagram of a method 900 for generating digital pixel-wise outputs from a CMOS image sensor (CIS), according to various embodiments. Embodiments of the method 900 begin at stage 904 by receiving a pixel signal at a programmable gain amplifier (PGA) coupled with a pixel output of the CIS. The pixel output is one of multiple pixel outputs of the CIS, each coupled with an associated one of multiple PGAs. For example, each PGA is part of a column-parallel analog-to-digital converter (ADC). Each PGA supports N gain settings (N being an integer greater than 1). For example, N can equal two, such that the PGA supports a high-gain setting and a low-gain setting.

At stage 908, embodiments execute, for each gain setting (Gn) of the N gain settings, a respective reset phase conversion to obtain a respective baseline offset (BOn) associated with the Gn. In some embodiments, executing the respective reset phase conversion at stage 908 includes, iteratively, for each Gn: setting the gain of the PGA according to the Gn, the PGA generating the PGA output signal responsive to the pixel signal being in an auto-zeroing (AZ) mode; ramping up a reference voltage from a low reference level to an AZ threshold level, the low reference level being below a predetermined lowest level for the PGA output signal, and the AZ threshold level being above the PGA output signal; and triggering a counter to begin counting along with a beginning of the ramping up, such that the count value upon stopping the counting indicates the BOn corresponding to the Gn.

At stage 912, embodiments determine a pre-decision value as a function of a pixel signal, the pre-decision value corresponding to a selected one of the gain settings (Gs). In some embodiments, determining the pre-decision value at stage 912 includes: setting the gain of the PGA according to a high-gain setting, the PGA generating the PGA output signal responsive to the pixel signal being in a transfer signal (TS) mode; setting the reference voltage to a TS threshold level (e.g., corresponding to a pre-decision threshold level times the gain of the PGA according to the high-gain setting); and triggering a latch, at a pre-decision enable time, to record a value at the output comparator node as the pre-decision value.

At stage 916, embodiments convert the pixel signal by using the pre-decision value to set a gain of the PGA to the Gs and obtaining a signal offset (SO). In some embodiments, converting the pixel signal at stage 916 includes setting the gain of the PGA according to the Gs responsive to determining the pre-decision value, the PGA generating the PGA output signal responsive to the pixel signal being in a transfer signal (TS) mode; ramping up the reference voltage from a low reference level to a high reference level, the low reference level being below a predetermined lowest level for the PGA output signal, and the high reference level being above a predetermined highest level for the PGA output signal; and triggering the counter to begin counting along with a beginning of the ramping up, such that the count value upon stopping the counting indicates the SO.

At stage 920, embodiments compute a digital pixel output for the pixel signal as a function of the SO and the BOs, wherein the BOs is the BOn corresponding to the Gs. In some embodiments, the computing at stage 920 comprises performing digital correlated double sampling (CDS), such that the digital pixel output relates to a difference between the SO and the BOs.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A programmable-gain analog-to-digital converter system for use with a CMOS image sensor (CIS), the system comprising:
    a programmable gain amplifier (PGA) configured to receive a pixel signal from a pixel output of a CMOS image sensor (CIS), the pixel output being one of a plurality of pixel outputs of the CIS, each coupled with an associated one of a plurality of PGAs, each PGA having N gain settings, N being an integer greater than 1; and
    a processor coupled with the PGA, and configured to:
        execute, for each gain setting (Gn) of the N gain settings, a respective reset phase conversion to obtain a respective baseline offset (BOn) associated with the Gn;
        determine a pre-decision value as a function of a pixel signal, the pre-decision value corresponding to a selected one of the gain settings (Gs);
        convert the pixel signal by using the pre-decision value to set a gain of the PGA to the Gs and obtaining a signal offset (SO); and
        compute a digital pixel output for the pixel signal as a function of the SO and the BOs, wherein the BOs is the BOn corresponding to the Gs.

2. The system of claim 1, wherein the processor is configured to compute the digital pixel output by performing digital correlated double sampling such that the digital pixel output relates to a difference between the SO and the BOs.

3. The system of claim 1, wherein N equals two, such that each PGA has a high gain setting and a low gain setting.

4. The system of claim 1, wherein:
    the PGA comprises an operational amplifier having an input node to receive the pixel signal via an input capacitor network, and an output node coupled by a feedback path with the input node via a feedback capacitor network having a plurality of feedback capacitors;
    the gain of the PGA is determined according to a capacitance ratio between the input capacitor network and the feedback capacitor network; and
    the processor is configured to set the gain of the PGA by selectively switching some or all of the feedback capacitors into the feedback path to adjust total capacitance of the feedback capacitor network.

5. The system of claim 4, wherein:
    the feedback capacitor network comprises a first feedback capacitor coupled with the input node via a first switch and coupled with the output node via a second switch, the first switch and the second switch being always closed, such that the first feedback capacitor is always in the feedback path; and
    the feedback capacitor network comprises a second feedback capacitor coupled with the input node via a third switch and coupled with the output node via a fourth switch, the third switch and the fourth switch operated in accordance with the gain setting, such that the third switch and the fourth switch are both closed according to the PGA being in a first of the N gain settings, and the third switch and the fourth switch are both open according to the PGA being in a second of the N gain settings.

6. The system of claim 1, further comprising:
a comparator having a first input comparator node coupled with a PGA output signal that is generated by the PGA, a second input comparator node coupled with a reference voltage, and an output comparator node to output a first comparator value when the PGA output signal is higher than the reference voltage and to output a second comparator value when the reference voltage is higher than the PGA output signal; and
a counter coupled with the comparator and configured to stop counting responsive to detecting a change from the first comparator value to the second comparator value, and to output a count value.

7. The system of claim 6, wherein the processor is configured to execute the respective reset phase conversion, iteratively, for each Gn, by:
setting the gain of the PGA according to the Gn, the PGA generating the PGA output signal responsive to the pixel signal being in an auto-zeroing (AZ) mode;
ramping up the reference voltage from a low reference level to an AZ threshold level, the low reference level being below a predetermined lowest level for the PGA output signal, and the AZ threshold level being above the PGA output signal; and
triggering the counter to begin counting along with a beginning of the ramping up, such that the count value upon stopping the counting indicates the BOn corresponding to the Gn.

8. The system of claim 6, further comprising:
a latch having a latch input coupled with the output comparator node and a latch output coupled with a PGA gain control,
wherein the processor is configured to determine the pre-decision value by:
setting the gain of the PGA according to a high-gain setting, the PGA generating the PGA output signal responsive to the pixel signal being in a transfer signal (TS) mode;
setting the reference voltage to a TS threshold level; and
triggering the latch, at a pre-decision enable time, to record a value at the output comparator node as the pre-decision value, such that the pre-decision value directs selection of one of the gain settings for the PGA via the PGA gain control.

9. The system of claim 8, wherein the TS threshold level corresponds to a pre-decision threshold level times the gain of the PGA according to the high-gain setting.

10. The system of claim 6, wherein the processor is configured to convert the pixel signal by:
setting the gain of the PGA according to the Gs responsive to determining the pre-decision value, the PGA generating the PGA output signal responsive to the pixel signal being in a transfer signal (TS) mode;
ramping up the reference voltage from a low reference level to a high reference level, the low reference level being below a predetermined lowest level for the PGA output signal, and the high reference level being above a predetermined highest level for the PGA output signal; and
triggering the counter to begin counting along with a beginning of the ramping up, such that the count value upon stopping the counting indicates the SO.

11. The system of claim 10, wherein:
across all the N gain settings, SO has a full-scale range of 0 to $(2^M)-1$;
a first of the gain settings is associated with a first portion of the full-scale range extending from 0 to a first intermediate value of the full-scale range;
a second of the gain settings is associated with a second portion of the full-scale range extending from a second intermediate value of the full-scale range to $2^M)-1$, the second portion overlapping the first portion;
the counter has a base counter resolution of K bits, wherein K=M−X; and
converting the pixel signal comprises:
with Gs corresponding to the first of the gain settings, the counter is configured to represent values from 0 to $2^K)-1$, the first intermediate value being less than $2^K)-1$; and
with Gs corresponding to the second of the gain settings, the counter is configured to represent values from $2^X$ to $(2^M)-1$, the second intermediate value being greater than $2^X$.

12. A CMOS image sensor (CIS) comprising:
an array of pixels, each comprising a photodetector circuit configured to record a pixel signal level responsive to being exposed to an amount of light during an exposure window, the array having a plurality of pixel rows and a plurality of pixel columns;
a plurality of column-parallel analog-to-digital converters (ADCs), each ADC coupled with a respective one of the plurality of pixel columns, each ADC comprising:
a programmable gain amplifier (PGA) configured to receive a pixel signal from a pixel output of a CMOS image sensor (CIS), the pixel output being one of a plurality of pixel outputs of the CIS, each coupled with an associated one of a plurality of PGAs, each PGA having N gain settings, N being an integer greater than 1; and
a processor coupled with the PGA, and configured to:
execute, for each gain setting (Gn) of the N gain settings, a respective reset phase conversion to obtain a respective baseline offset (BOn) associated with the Gn;
determine a pre-decision value as a function of a pixel signal, the pre-decision value corresponding to a selected one of the gain settings (Gs);
convert the pixel signal by using the pre-decision value to set a gain of the PGA to the Gs and obtaining a signal offset (SO); and
compute a digital pixel output for the pixel signal as a function of the SO and the BOs, wherein the BOs is the BOn corresponding to the Gs.

13. A method for generating digital pixel-wise outputs from a CMOS image sensor (CIS) the method comprising:
receiving a pixel signal at a programmable gain amplifier (PGA) coupled with a pixel output of the CIS, the pixel output being one of a plurality of pixel outputs of the CIS, each coupled with an associated one of a plurality of PGAs, each PGA having N gain settings, N being an integer greater than 1;
executing, for each gain setting (Gn) of the N gain settings, a respective reset phase conversion to obtain a respective baseline offset (BOn) associated with the Gn;
determining a pre-decision value as a function of a pixel signal, the pre-decision value corresponding to a selected one of the gain settings (Gs);
converting the pixel signal by using the pre-decision value to set a gain of the PGA to the Gs and obtaining a signal offset (SO); and computing a digital pixel output for the pixel signal as a function of the SO and the BOs, wherein the BOs is the BOn corresponding to the Gs.

14. The method of claim 13, wherein the computing the digital pixel output comprises performing digital correlated double sampling such that the digital pixel output relates to a difference between the SO and the BOs.

15. The method of claim 13, wherein N equals two, such that each PGA has a high gain setting and a low gain setting.

16. The method of claim 13, wherein:

the executing the respective reset phase conversion, the determining the pre-decision value, and the converting the pixel signal are performed using a comparator and a counter;

the comparator has a first input comparator node coupled with a PGA output signal that is output by the PGA, a second input comparator node coupled with a reference voltage, and an output comparator node to output a first comparator value when the PGA output signal is higher than the reference voltage and to output a second comparator value when the reference voltage is higher than the PGA output signal; and the counter is configured to stop counting responsive to detecting a change from the first comparator value to the second comparator value, and to output a count value.

17. The method of claim 16, wherein the executing the respective reset phase conversion comprises, iteratively, for each Gn:

setting the gain of the PGA according to the Gn, the PGA generating the PGA output signal responsive to the pixel signal being in an auto-zeroing (AZ) mode;

ramping up the reference voltage from a low reference level to an AZ threshold level, the low reference level being below a predetermined lowest level for the PGA output signal, and the AZ threshold level being above the PGA output signal; and triggering the counter to begin counting along with a beginning of the ramping up, such that the count value upon stopping the counting indicates the BOn corresponding to the Gn.

18. The method of claim 16, wherein the determining the pre-decision value comprises:

setting the gain of the PGA according to a high-gain setting, the PGA generating the PGA output signal responsive to the pixel signal being in a transfer signal (TS) mode;

setting the reference voltage to a TS threshold level; and triggering a latch, at a pre-decision enable time, to record a value at the output comparator node as the pre-decision value.

19. The method of claim 16, wherein the converting the pixel signal comprises:

setting the gain of the PGA according to the Gs responsive to determining the pre-decision value, the PGA generating the PGA output signal responsive to the pixel signal being in a transfer signal (TS) mode;

ramping up the reference voltage from a low reference level to a high reference level, the low reference level being below a predetermined lowest level for the PGA output signal, and the high reference level being above a predetermined highest level for the PGA output signal; and triggering the counter to begin counting along with a beginning of the ramping up, such that the count value upon stopping the counting indicates the SO.

20. The method of claim 19, wherein:

across all the N gain settings, SO has a full-scale range of 0 to $2^M-1$;

a first of the gain settings is associated with a first portion of the full-scale range extending from 0 to a first intermediate value of the full-scale range;

a second of the gain settings is associated with a second portion of the full-scale range extending from a second intermediate value of the full-scale range to $2^M-1$, the second portion overlapping the first portion;

the counter has a base counter resolution of K bits, wherein K=M−X; and converting the pixel signal comprises:

with Gs corresponding to the first of the gain settings, the counter is configured to represent values from 0 to $2^K-1$, the first intermediate value being less than $2^K-1$; and with Gs corresponding to the second of the gain settings, the counter is configured to represent values from $2^X$ to $2^M-1$, the second intermediate value being greater than $2^X$.

* * * * *